(12) United States Patent
Nakamura et al.

(10) Patent No.: US 8,189,445 B2
(45) Date of Patent: May 29, 2012

(54) OPTICAL DISK REPRODUCING APPARATUS

(75) Inventors: Yusuke Nakamura, Yokohama (JP); Masakazu Ikeda, Odawara (JP)

(73) Assignee: Renesas Electronics Corporation, Kanagawa (JP)

(*) Notice: Subject to any disclaimer, the term of this patent is extended or adjusted under 35 U.S.C. 154(b) by 0 days.

(21) Appl. No.: 13/150,758

(22) Filed: Jun. 1, 2011

(65) Prior Publication Data
US 2011/0228662 A1  Sep. 22, 2011

Related U.S. Application Data

(62) Division of application No. 11/948,392, filed on Nov. 30, 2007.

(30) Foreign Application Priority Data

Feb. 19, 2007  (JP) .................................. 2007-037360

(51) Int. Cl.
*G11B 20/10* (2006.01)
(52) U.S. Cl. ................................... 369/59.22
(58) Field of Classification Search ............... 369/59.22, 369/47.24
See application file for complete search history.

(56) References Cited

U.S. PATENT DOCUMENTS

| | | | |
|---|---|---|---|
| 6,501,610 | B1 | 12/2002 | Sugawara et al. |
| 2001/0040749 | A1 | 11/2001 | Ohta |
| 2006/0023604 | A1 | 2/2006 | Yamakawa et al. |
| 2007/0097822 | A1 | 5/2007 | Iwanaga |

FOREIGN PATENT DOCUMENTS

| | | |
|---|---|---|
| JP | 9213008 | 8/1997 |
| JP | 2000-163748 | 6/2000 |
| JP | 2000-182335 | 6/2000 |
| JP | 2001-256734 | 9/2001 |
| JP | 2003-123402 | 4/2003 |
| JP | 2004-178627 | 6/2004 |
| JP | 2005-85376 | 3/2005 |
| JP | 2006-048737 | 2/2006 |

OTHER PUBLICATIONS

Office Action in JP 2007-037360, dispatch date Jul. 19, 2011, [4 pgs., in Japanese]; English language Translation (2 pgs.).
Office Action in Taiwanese Patent Application 096139689, dated Jun. 7, 2011 (4 pages), English language translation (3 pages).

*Primary Examiner* — Joseph Haley
*Assistant Examiner* — Nicholas Lee
(74) *Attorney, Agent, or Firm* — Antonelli, Terry, Stout & Kraus, LLP.

(57) ABSTRACT

The present invention relates to an optical disk reproducing apparatus, and provides a technology capable of supporting even a situation in which a reproduction signal characteristic is changed due to a factor other than recording density of an optical disk by using PRML of different constrained length and capable of improving reading accuracy. The optical disk reproducing apparatus includes a PRML circuit of first constrained length (for example, 4) and a PRML circuit of second constrained length (for example, 5). Equalization error values obtained during calculation of equalization learning in respective circuits are compared with each other in a determination circuit. Switching control of a switch is performed so that an output of one of the PRML circuits having a smaller equalization error value is selected.

3 Claims, 12 Drawing Sheets

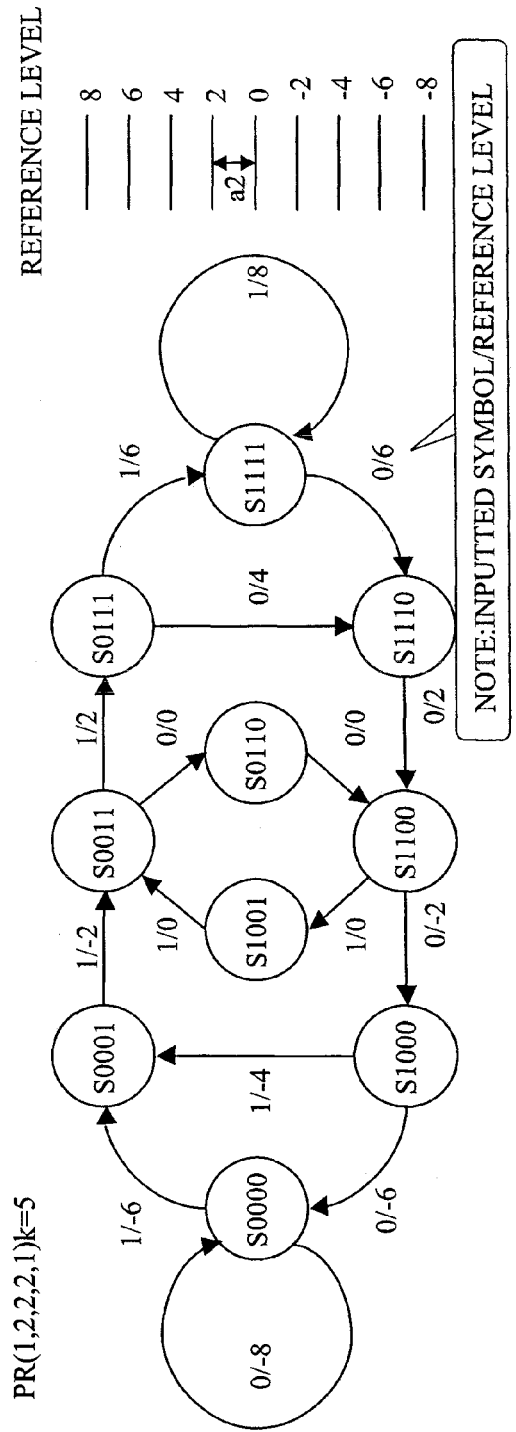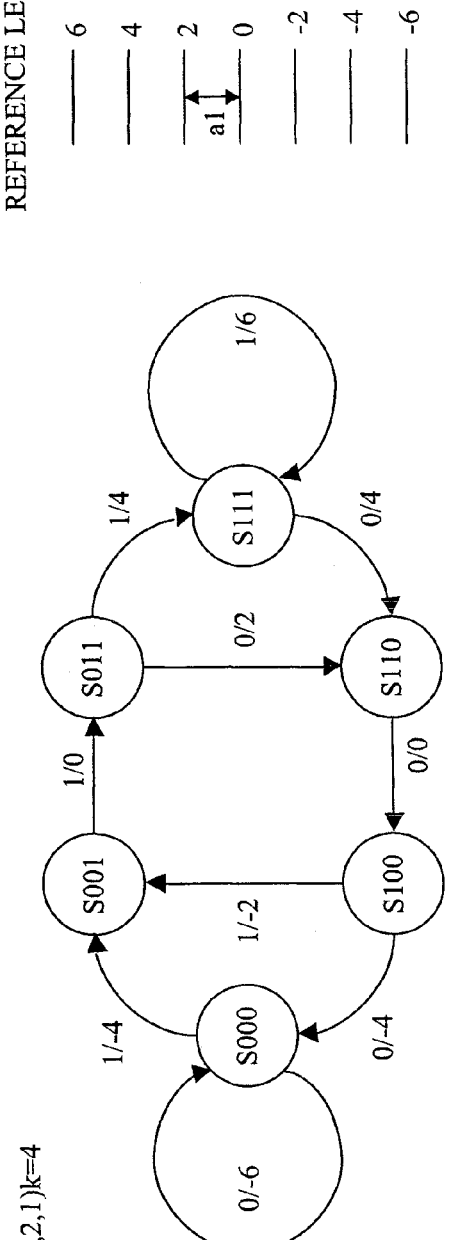
FIG. 3A
FIG. 3B

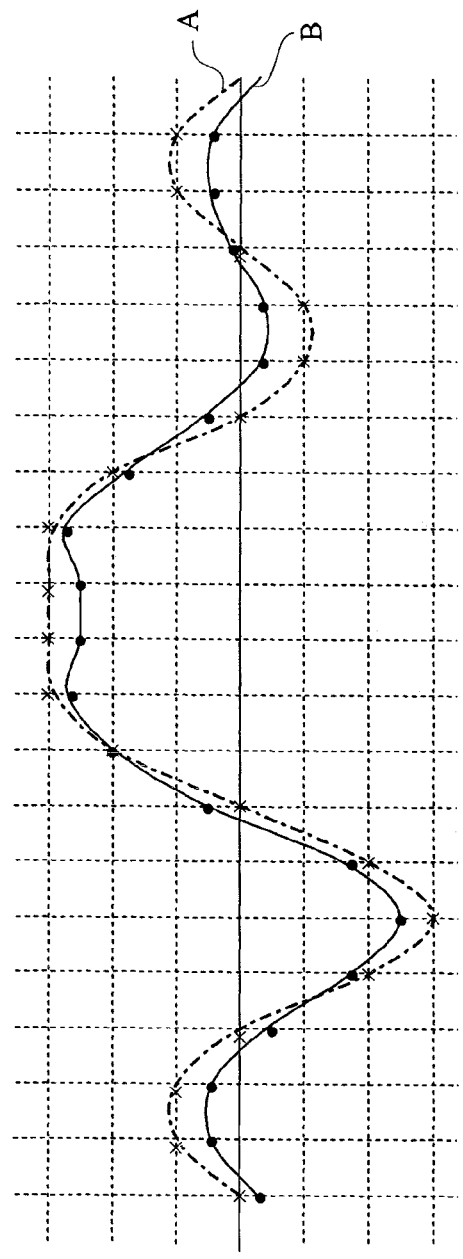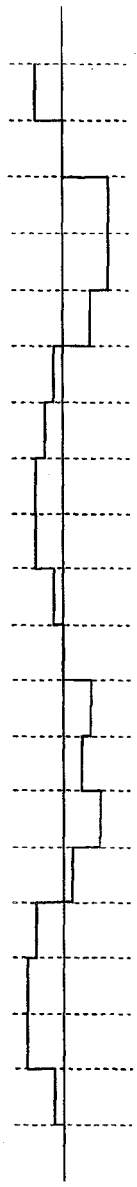
FIG. 4A
EQUALIZATION TARGET (A)
EQUALIZATION OUTPUT (B)
FIG. 4B
EQUALIZATION ERROR
(C=A-B)

OPTICAL DISK REPRODUCING APPARATUS

CROSS-REFERENCE TO RELATED APPLICATIONS

This application is a divisional application of U.S. application Ser. No. 11/948,392, filed Nov. 30, 2007 and which applications claim priority from Japanese Patent Application No. JP 2007-037360 filed on Feb. 19, 2007, the content of which are hereby incorporated by reference into this application.

TECHNICAL FIELD OF THE INVENTION

The present invention relates to an optical disk reproducing apparatus that reads a data signal from an optical disk for reproduction and, in particular, to Partial Response (PR) equalization and a Partial Response Maximum Likelihood (PRML) method.

BACKGROUND OF THE INVENTION

In relation to a conventional optical disc reproducing apparatus and the PRML processing, Japanese Patent Application Laid-Open Publication No. 2006-48737 (Patent Document 1) discloses technology of switching a PRML processing function according to a high-density recording region and a low-density recording region of an optical disk (paragraphs 0006, 0007 and the like).

And, Japanese Patent Application Laid-Open Publication No. 2004-178627 (Patent Document 2) discloses a Viterbi decoding circuit and an information reproducing apparatus in which a reference value (a reference level) for each path is generated at a reference-value generation circuit based on an inputted value and a generated information bit and is inputted as a reference value of a branch-metric calculation circuit (paragraphs 0023 and the like). Furthermore, it is described that by adaptively-processing the reference level of the branch-metric calculation, it becomes possible to follow fluctuation of a channel characteristic (paragraph 0023).

In the technology disclosed in Patent Document 1, in each of areas having recording density different from each other, a PRML class suitable for each area can be used respectively. However, this technology cannot support a case in which characteristic, such as an amount of inter-symbol interference of a reproduction signal, is changed in an area of the same recording density in the same type of disks due to a factor other than change in the recording density.

And, in the technology disclosed in Patent Document 2, although the characteristics can be adaptively changed to a PR characteristic (a PRML processing) with constrained length (hereinafter referred to as k) of 4 (constant) as represented by PR(a, b, c, d), the characteristics cannot be adaptively switched to a PR characteristic with other constrained length, such as PR(a, b, c) (k=3) and PR(a, b, c, d, e) (k=5).

Increase in recording density of a disk causes problems in which desired effect cannot necessarily be obtained for signal reading accuracy at data reproduction by a conventional PRML processing with constant constrained length (k=4, for example). A first problem is that since a method of switching of PRML processing functions is fixed conventionally, an optimum PRML class (a PR coefficient) cannot necessarily be selected. A second problem is that since the PRML constrained length (k) is fixed conventionally, although a reproduction signal characteristic with a certain width can be supported, an error tends to occur for a wide-band signal when the PRML constrained length is fixed to a value corresponding to a narrow-band.

SUMMARY OF THE INVENTION

The present invention is made in view of the above problems, and an object of the present invention relates to an optical disk reproducing apparatus that performs a PRML processing and is to provide a technology capable of supporting a reproduction signal characteristic changed due to a factor other than recording density also, using a suitable PRML processing, capable of supporting with PR characteristics of different constrained length (k) and capable of improving signal reading accuracy (performance) at data reproduction.

The typical ones of the inventions disclosed in this application will be briefly described as follows. To achieve the above object, the present invention is technology for an optical disk reproducing apparatus, and has a configuration described below.

In the optical disk reproducing apparatus, at a PRML processing of data reproduction, not only adaptively-changing a PR coefficient (a PR class coefficient) of a PR characteristic as in a technology disclosed in Patent Document 2 as premised technology, but also control is performed so that a plurality of PRML processings with different constrained length (k) is selected (switched) adoptively according to a reproduction signal characteristic. And, in the apparatus, by measuring, detecting and condition-determining a frequency characteristic of the reproduction signal in addition to recording density, a PRML processing circuit with optimum constrained length (k) is always selected.

The present optical disk reproducing apparatus has a configuration described below, for example. The apparatus includes a pickup irradiating laser light to an optical disk and converting reflected light thereof to an electric signal; an analog front end performing an analog processing to the electric signal outputted from the pickup; a digitalization circuit digitalizing an analog signal outputted from the analog front end and outputting a multi-level signal (an A/D converter); a first PRML processing circuit of a PRML method with constrained length of m (m: a natural number); a second PRML processing circuit of the PRML method with the constrained length of n (n≧m); a switch selecting and outputting one of an output of the first PRML processing circuit and an output of the second PRML processing circuit; a decoder performing a decode-processing to an output of the switch and outputting a reproduction data signal; and a determination circuit performing switching control of the switch.

The first PRML processing circuit includes a first equalization circuit equalizing the multi-level signal with a target signal of the PRML method with the constrained length of m; a first reference-value generation circuit generating a first target signal of the PRML method with the constrained length of m from a first equalization signal outputted from the first equalization circuit and an output of a first maximum-likelihood decoding circuit; a first adaptive learning circuit determining a parameter (a filter coefficient) of the first equalization circuit from the first equalization signal and the first target signal; and the first maximum-likelihood decoding circuit obtaining a first binarization signal from the first target signal and the first equalization signal based on the PRML method with the constrained length of m. Similarly, the second PRML processing circuit includes a second equalization circuit equalizing the multi-level signal with a target signal of the PRML method with the constrained length of n; a second reference-value generation circuit generating a second target signal of the PRML method with the constrained length of n from a second equalization signal outputted from the second equalization circuit and an output of a second maximum-likelihood decoding circuit; a second adaptive learning circuit determining a parameter (a filter coefficient) of the second equalization circuit from the second equalization signal and the second target signal; and the second maximum-likelihood decoding circuit obtaining a second binarization signal from the second target signal and the second equalization signal based on the PRML method with the constrained length of n.

And, in the determination circuit, based on a result of comparison and condition-determination between a first equalization error value consisting of a difference between the first equalization signal and the first target signal calculated by the first adaptive learning circuit and a second equalization error value consisting of a difference between the second equalization signal and the second target signal calculated by the second adaptive learning circuit, switching control of the switch is performed so that a suitable one of outputs (the first binarization signal and the second binarization signal) of the first maximum-likelihood decoding circuit of the PRML method of the constrained length m and the second maximum-likelihood decoding circuit of the PRML method of the constrained length n (one having a PR characteristic more similar to a reproduction signal characteristic) is selected.

And, in particular, the determination circuit performs control so that the output of the second maximum-likelihood decoding circuit (the second binarization signal) is selected only during a period of time of making the second equalization error value (C2) smaller than the first equalization error value (C1) (C2<C1) when the period of time is longer than or equal to a fixing period.

The effects obtained by typical aspects of the present invention will be briefly described below. The present invention relates to an optical disk reproducing apparatus that performs a PRML processing, can support a reproduction signal characteristic changed due to a factor other than recording density also, by a suitable PRML processing, can support with a PR characteristic having different constrained length (k) and can improve signal reading accuracy (performance) at data reproduction.

In particular, by adaptively-changing the PRML constrained length (k) and the PR coefficient, accuracy improvement can be achieved. Also, in a case where a characteristic, such as an amount of inter-symbol interference of a reproduction signal waveform, changes according to the situation due to, for example, track recording density and reproduction double-speed of an optical disk and an electronic-circuit-element characteristic, a transmission-line characteristic and an optical-system characteristic of an optical disk reproducing apparatus, by selecting a PRML processing circuit of suitable constrained length (k), the accuracy can be improved.

BRIEF DESCRIPTIONS OF THE DRAWINGS

FIG. 3A is a diagram showing an example of relation between constrained length of partial response and the number of existing states and a reference level in an optical disk reproducing apparatus according to each embodiment of the present invention;

FIG. 3B is a diagram showing an example of relation between constrained length of partial response and the number of existing states and a reference level in the optical disk reproducing apparatus according to each embodiment of the present invention;

FIG. 4A is a diagram showing an example of an equalization target and an equalization output in the partial response in the optical disk reproducing apparatus according to each embodiment of the present invention;

FIG. 4B is a diagram showing an example of an equalization error calculated from the equalization target and the equalization output in the partial response in the optical disk reproducing apparatus according to each embodiment of the present invention;

DESCRIPTIONS OF THE PREFERRED EMBODIMENTS

Hereinafter, embodiments of the present invention will be described in detail with reference to the accompanying drawings. Note that the same components are denoted by the same reference symbols throughout the drawings for describing the embodiment, and the repetitive description thereof will be omitted. Note that, a PR characteristic in a PRML processing circuit are represented in a form such as PR (a, b, c, d), where a to d represent PR class coefficients (PR coefficients).

First Embodiment

A first embodiment of the present invention is described using FIGS. 1 to 4B. An optical disc reproducing apparatus using the PRML method according to the first embodiment has a configuration capable of adaptively-changing the constrained length (k) and the PR coefficient of the PRML, when inter-symbol interference is changed according to a situation due to track recording density, reproduction double-speed, an electronic-circuit element characteristic, a transmission line characteristic, an optical-system characteristic and the like of a recording medium. The apparatus has a feature that PRML circuits of different constrained length (k) are switched based on a determination about an equalization error.

Figure 1:
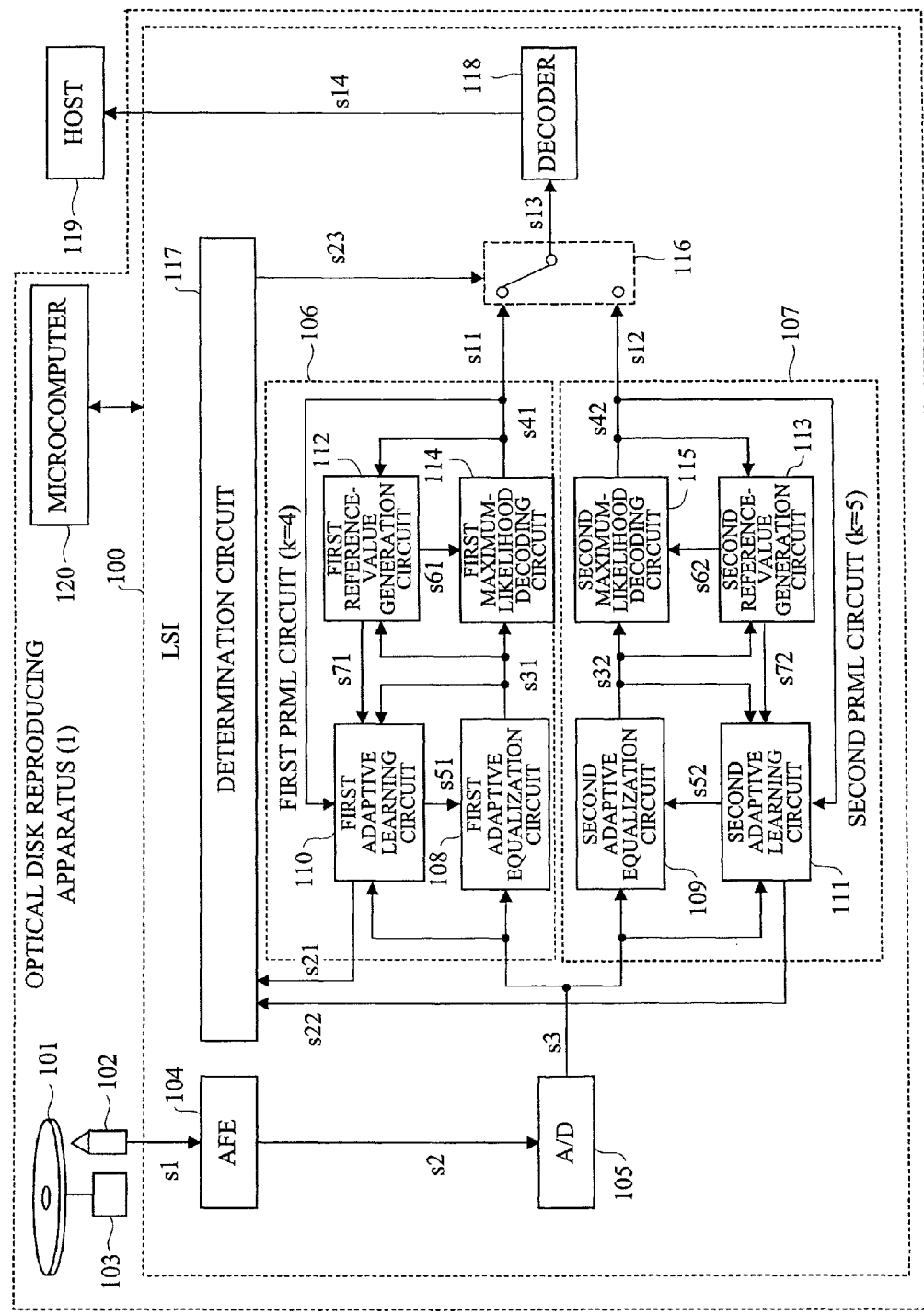
FIG. 1 is a block diagram showing a configuration of an optical disk reproducing apparatus according to a first embodiment of the present invention.

In FIG. 1, an optical disk reproducing apparatus according to the first embodiment and a configuration of a system including the apparatus are shown. The present apparatus includes two PRML processing circuits (106, 107) having different constrained length (k), respectively. The outputs of the two PRML processing circuits (106, 107) are switched based on a result of comparison and determination of equalization error values of these circuits made by a determination circuit 117. In the apparatus, a side of the first PRML processing circuit (106) of k=4 is selected usually. When the equalization error value (s21, s22) satisfies a predetermined condition, a side of the second PRML processing circuit (107) of k=5 is selected.

In the first and other embodiments, the PRML circuit of first constrained length (k1) is assumed to be a PRML circuit of k=4, whilst the PRML circuit of second constrained length (k2) is assumed to be a PRML circuit of k=5.

<Inter-Symbol Interference>

Figure 2:
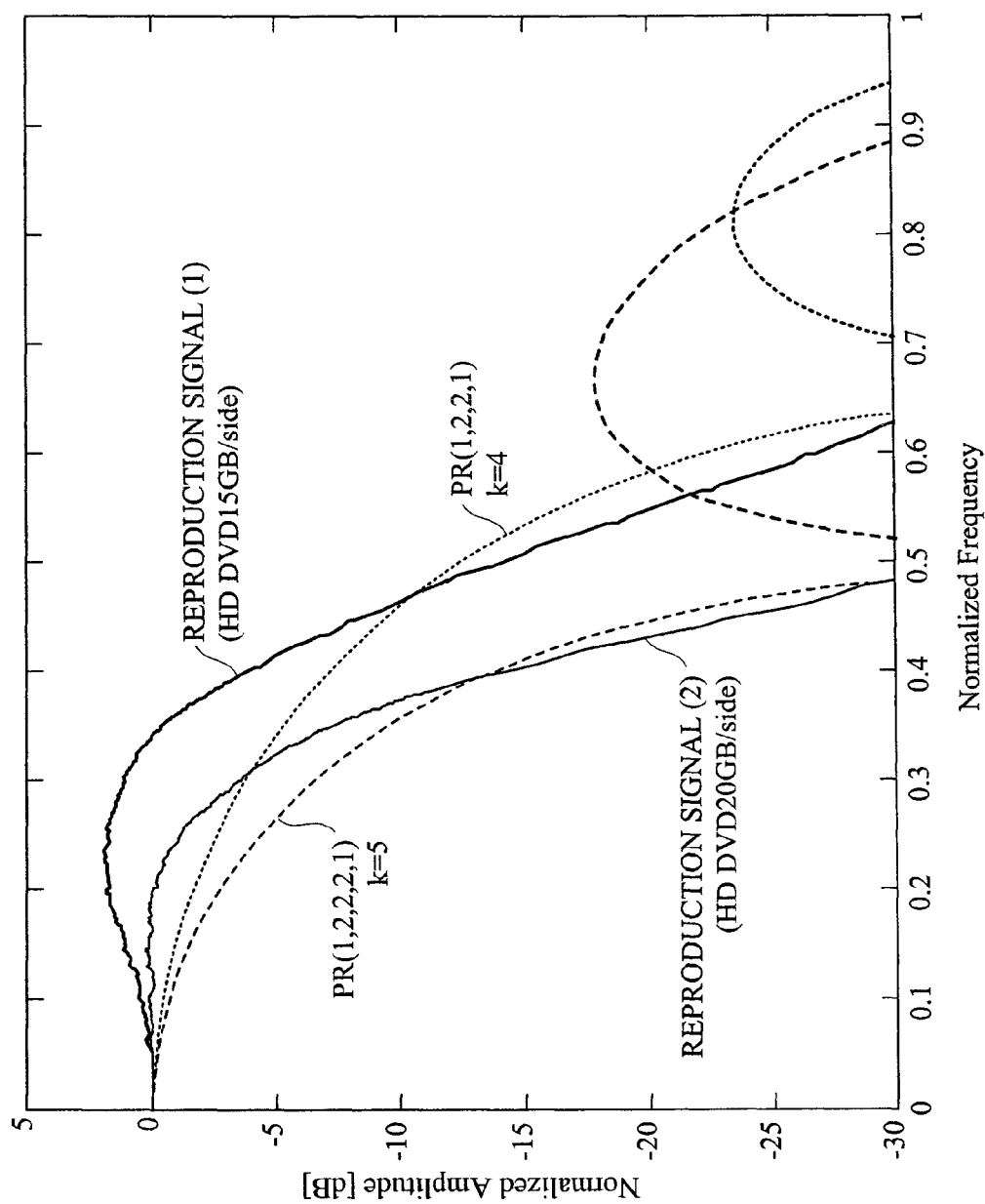
FIG. 2 is a diagram showing relation between a reproduction signal characteristic and a partial response characteristic of an optical disk according to each embodiment of the present invention.

Here, the inter-symbol interference is described using FIG. 2. For example, if track recording density of the recording medium is increased, since a light-gathering beam diameter of an optical pickup is limited, interference between read signals (inter-symbol interference) is increased, and therefore, amplitude of a high-frequency component is decreased. For example, amplitude characteristics with respect to a frequency of reproduction signals in a reproduction signal (1) when an HD DVD-ROM having a capacity of 15 GB/side is reproduced and in a reproduction signal (2) when an HD DVD-ROM having a capacity of 20 GB/side are shown in FIG. 2. Note that, the frequency is normalized with a reproduction clock, and an amplitude value is normalized with a value of DC. By comparing two characteristics with each other, it can be observed that amplitude in high-frequency of the reproduction signal (2) with 20 GB/side are more decreased than that of the reproduction signal (1) with 15 GB/side.

And, in FIG. 2, together with the characteristics of the signals (1), (2), amplitude characteristics with respect to a frequency of PR(1, 2, 2, 1) of k=4 and PR(1, 2, 2, 2, 1) of k=5 are shown as PR characteristics of different constrained length (k). By comparing these characteristics with each other, it can be observed that the characteristic of PR(1, 2, 2, 2, 1) is more similar to the characteristic of the reproduction signal (2) with 20 GB/side. And therefore, when amplitude in high-frequency is decreased, equalization is preferably made with PR(1, 2, 2, 2, 1) of k=5. Note that, PR(1, 2, 2, 2, 1) of k=5 tends to cause a decoding error to occur compared with PR(1, 2, 2, 1) of k=4.

<State Transition and Reference Level>

FIG. 3A shows a state transition and level (reference level) distribution according to a state of PR(1, 2, 2, 2, 1) of k=5. FIG. 3B shows a state transition and level (reference level) distribution according to a state of PR (1, 2, 2, 1) of k=4. The number of existing states of k=5 is larger than that of k=4, and therefore, the number of existing reference levels of k=5 is larger than that of k=4. The number of reference levels of k=5 is 9, whilst the number of reference levels of k=4 is 7. Since the number of reference level is large in a case of k=5, a difference between adjacent levels (a level interval (a2 and the like)) is small, a difference in path metric at Viterbi decoding is small, as a result, possibility of occurrence of an decoding error is increased. And therefore, when the characteristic is similar to the characteristic of PR(1, 2, 2, 1) with K=4 and equalization can be performed with k=4, like the reproduction signal (1) of 15 GB/side in FIG. 2, it is desirable to process by the PRML of k=4.

<Equalization Error>

And, an equalization error is described using FIG. 4. The equalization error (denoted as C) is a difference between a target waveform obtained by convolution of the PR characteristic and binarization data (an equalization target, denoted as A) and an output obtained by actual equalization at an equalization circuit (an equalization output, denoted as B). The equalization error (C) can be used also as an index indicating degree of equalization achievement with respect to the equalization target (A). As the equalization error (C) is smaller, the characteristic is more similar to the target PR characteristic.

<Apparatus Configuration>

The detailed configuration of the optical disk reproducing apparatus is described in FIG. 1. The disk reproducing apparatus includes an LSI (an optical disk reproduction LSI) 100, an optical disk 101 (simply referred to as a disk) to be set, a pickup 102, a motor 103 and a microcomputer 120 and the like. The LSI 100 and the microcomputer 120 are connected to each other. Note that, the LSI 100 and the microcomputer 120 can be configured as an integrated IC substrate. And, a host 119 is connected to the apparatus (in particular, a decoder 118). The apparatus is, for example, an HD DVD drive or the like. The microcomputer 120 is a controlling unit and controls the system including the LSI 100 portion. The host 119 is an information processing apparatus, such as a user PC, provided outside of the optical disk reproducing apparatus.

The optical disk 101 is a recording medium having data recorded thereon, and is an HD DVD, for example. The pickup 102 reads a data signal of the optical disk 101. A spindle motor 103 rotates the optical disk 101.

The LSI 100 includes an analog front end (an AFE) 104, an A/D converter 105, a first constrained-length PRML processing circuit 106, a second constrained-length PRML processing circuit 107, a switch 116, a determination circuit (a constrained-length determination circuit) 117 and the decoder 118.

The AFE 104 performs an analog processing to the data (s1) read by the pickup 102 from the optical disk 101. The A/D converter 105 converts an analog signal (s2) from the AFE 104 to a digital signal (a multi-level signal) (s3).

The first constrained length PRML processing circuit (a first PRML circuit) 106 performs a PRML processing of the PRML method of first constrained length (k1). The second constrained length PRML processing circuit (a second PRML circuit) 107 performs a PRML processing of the PRML method of second constrained length (k2). For example, the PRML of the first constrained length (k1) (a first PRML 106) is assumed to be PRML of k=4, such as PR(a, b, c, d), whilst the PRML of the second constrained length (k2) (a second PRML 107) is assumed to be PRML of k=5, such as PR(a, b, c, d, e). The PR coefficients (a to e and the like) can be set as appropriate.

The first PRML circuit 106 of k=4 includes a first adaptive equalization circuit 108, a first adaptive learning circuit 110, a first reference-value generation circuit 112, and a first maximum-likelihood decoding circuit 114.

The first adaptive equalization circuit 108 equalizes an inputted signal (s3) with a desired PR characteristic (a coefficient). The first adaptive equalization circuit 108 outputs a signal (s31) equalized based on a filter coefficient (s51) determined at the first adaptive learning circuit 110 to each unit.

The first adaptive learning circuit 110 calculates the filter coefficient (s51) required for an equalization processing at the first adaptive equalization circuit 108. The first adaptive learning circuit 110 determines the filter coefficient (s51) from an inputted value (s31), a reference value (s71) and an outputted value (s41) by calculation. And, the first adaptive learning circuit 110 outputs a signal (s21) of an equalization error (C) calculated from an equalization value (s31) and a reference value (s71) to the determination circuit 117.

The first reference-value generation circuit 112 generates reference values (reference levels) (s61, s71) for each path from an inputted value (s31) and a pattern of an information bit (a binarization signal) generated at the first maximum-likelihood decoding circuit 114. Note that, the same is true in a case of a configuration in which the reference-value generation circuit is included in the maximum-likelihood decoding circuit.

The first maximum-likelihood decoding circuit 114 is a circuit receiving the reference value (s61) of each path generated at the first reference-value generation circuit 112 as a reference value of a branch-metric calculation circuit. With this, a maximum-likelihood processing is performed and the binarization signal (s41) is outputted.

The second PRML circuit 107 of k=5 includes, like the first PRML circuit 106, a second adaptive equalization circuit 109, a second adaptive learning circuit 111, a second reference-value generation circuit 113 and a second maximum-likelihood decoding circuit 115. The function of each of these components is similar to that of the first PRML circuit 106, although characteristics and processing values are different.

The switch 116 selects and outputs only one of outputs (s11, s12) from the first maximum-likelihood decoding circuit 114 and the second maximum-likelihood decoding circuit 115. The switching is controlled by a signal (s23) from the determination circuit 117.

The decoder 118 performs a decoding processing, an error-correction operation processing and a descrambling processing of a binarization data (s13) selected by the switch 116, and controls outputting of data (s14) to outside (the host 119).

The determination circuit 117 determines a suitable PRML circuit (one of 106 and 107) of constrained length (k) according to a characteristic of the reproduction signal (an amount of inter-symbol interference), based on inputs of signals (s21, s22) of equalization error values from the first and the second PRML circuits (106, 107) and controls switching of the switch 116 by a signal (s23).

<Reproduction Operation>

The reproduction operation in the optical disk reproducing apparatus is described. The signal (s1) read from the disk 101 through the pickup 102 is subjected to an analog processing at the AFE 104, and the resultant signal (s2) is inputted to the A/D converter 105. A signal (s3) obtained by a digitalization processing in the A/D converter 105 is inputted to the first PRML circuit 106 of k=4 and the second PRML circuit 107 of k=5.

In the first PRML circuit 106 of k=4, following processings are performed. PR(a, b, c, d) used as an equalization target is determined from the reference value (s71) generated at the first reference-value generation circuit 112. Then, the first adaptive learning circuit 110 generates an equalization target signal (A) from the decoded data (s41) of the first maximum-likelihood decoding circuit 114 and the reference value (s71), that is, PR(a, b, c, d). Then, the first adaptive learning circuit 110 calculates the filter coefficient (s51) of the first adaptive equalization circuit 108 so that the equalization error (C) which is a difference between the equalization target signal (A) and an outputted signal (s31) from the first adaptive equalization circuit 108, that is, the equalization output (B), is small. A signal (s31) obtained by performing an equalization processing to the outputted signal (s3) from the A/D converter 105 at the first adaptive equalization circuit 108 is inputted to the first maximum-likelihood decoding circuit 114 and the signal is decoded to a maximum-likelihood binary symbol (s41) based on a reference value (s61) from the first reference-value generation circuit 112 using Viterbi decoding and the like.

Similarly, in the second constrained-length PRML processing circuit 107 of k=5, following processings are performed. From the reference value (s72) generated at the second reference-value generation circuit 113, PR(a, b, c, d, e) used as an equalization target is determined. Then, the second adaptive learning circuit 111 generates an equalization target signal (A) from the decoded data (s42) of the second maximum-likelihood decoding circuit 115 and the reference value (s72), that is, PR(a, b, c, d, e). Then, the second adaptive learning circuit 111 calculates the filter coefficient (s52) of the second adaptive equalization circuit 109 so that the equalization error (C) which is a difference between the equalization target signal (A) and an outputted signal (s32) from the second adaptive equalization circuit 109, that is, the equalization output (B), is small. A signal (s32) obtained by performing an equalization processing to the outputted signal (s3) from the A/D converter 105 at the second adaptive equalization circuit 109 is inputted to the second maximum-likelihood decoding circuit 115 and the signal is decoded to a maximum-likelihood binary symbol (s42) based on a reference value from the second reference-value generation circuit 113 using Viterbi decoding and the like.

Here, the equalization error value (s21) calculated at the first adaptive learning circuit 110 in the first PRML circuit 106 of k=4 and the equalization error value (s22) calculated at the second adaptive learning circuit 111 in the second PRML circuit 107 of k=5 are inputted to the determination circuit 117 and compared. As a determination condition and control, the determination circuit 117 controls switching of the switch 116 by a signal (s23) so that an output from the PRML circuit (one of 106 and 107) having a smaller equalization error value for a fixing period of time is selected. In other words, the determination circuit 117 performs control so that an output (s42) from the second maximum-likelihood decoding circuit 115 is selected only during a period of time making the second equalization error value (s22) smaller than the first equalization error value (s21) (C2<C1) when the period of time continues for a period longer than or equal to a fixing period (a threshold value).

And, as described above, since the PRML circuit (107) of k=5 tends to cause a decoding error more often than the PRML circuit (106) of k=5, switching output from k=4 to k=5 based on determination at the determination circuit 117 is restricted so that the switching is performed only when the difference between the equalization error values (s21, s22) exceeds a predetermined threshold value. With this, a decoding error can be avoided.

The decoded data (s13) outputted from the switch 116 is inputted to the decoder 118 and the data is subjected to a demodulation processing, an error-correction processing and a descrambling processing. Then, a signal (s14), that is, reproduction data, is transferred to the host 119.

According to the circuit configuration and determination method of switching the constrained length (k) of PRML based on the equalization error (C) at the equalization processing, that is, switching the first and second PRML circuits (106, 107), the constrained length (k) and the PR coefficient of the PRML circuit can be adaptively changed according to the reproduction signal characteristic. Since the PRML circuit of the constrained length (k) which can perform the equalization processing more easily is always selected, the reading accuracy can be improved.

Note that, the PR coefficient is described with variables (such as a to d), such as PR(a, b, c, d), assuming that the PR coefficient is adaptively changed by the reference-value generation circuit (112 and the like). Alternatively, this can be described not in a form of variable value but also in a form of fixed value (such as a PR characteristic shown in FIG. 2). And, the constrained length (k) of PRML is not restricted to length described above (k=4, 5). Furthermore, in the above description, the characteristic of the adaptive equalization circuit (108 and the like) is adaptively changed by the adaptive learning circuit (110 and the like). Alternatively, a configuration in which the characteristic is fixed by fixing the filter coefficient of the equalization circuit (108 and the like) can be employed. The same goes not only for the first embodiment but also for the following embodiments.

Second Embodiment

Figure 5:
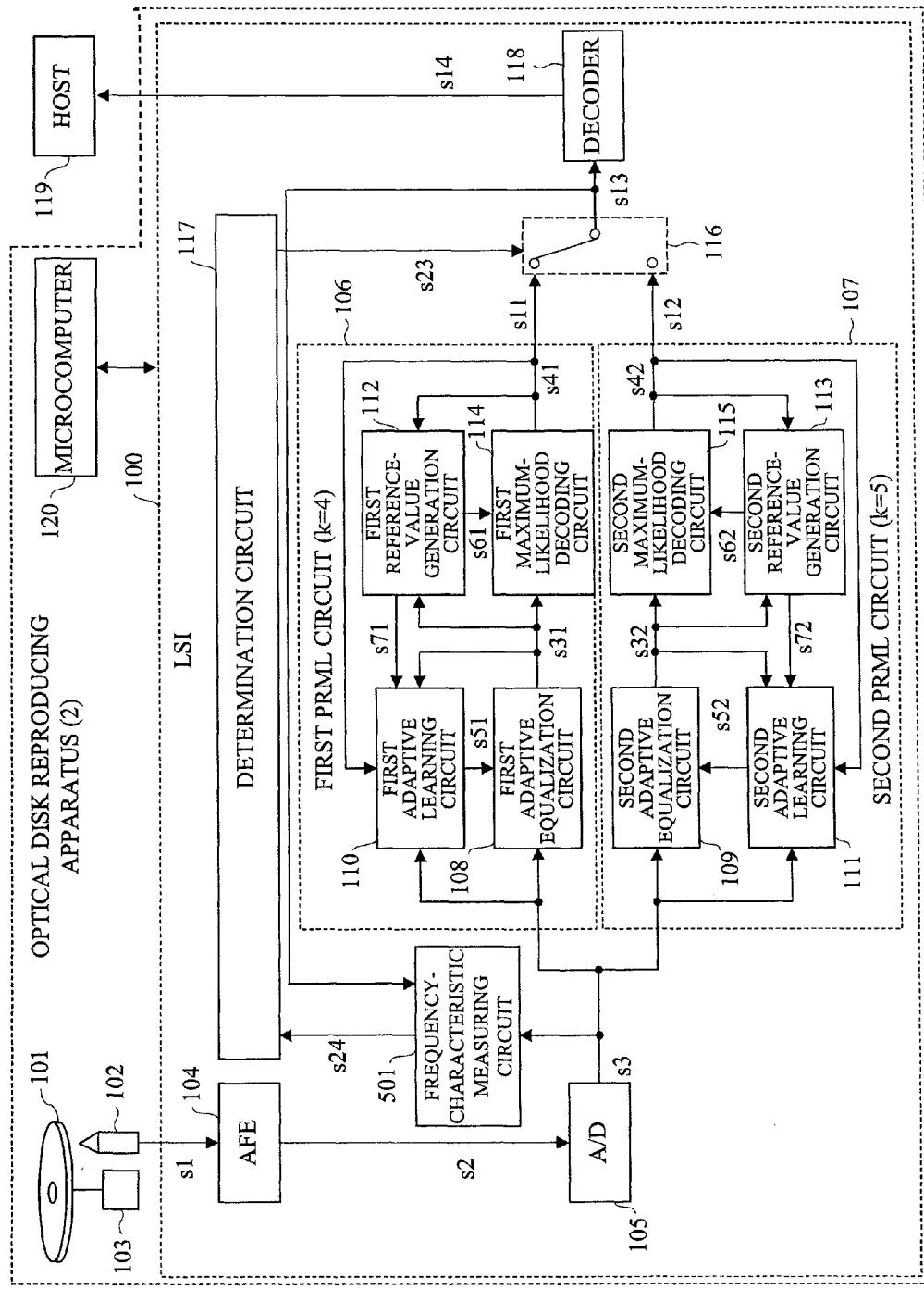
FIG. 5 is a block diagram showing a configuration of an optical disk reproducing apparatus according to a second embodiment of the present invention.

A second embodiment of the present invention is described using FIG. 5 and the like. FIG. 5 shows a configuration of an optical disk reproducing apparatus according to the second embodiment. In the second embodiment, in an optical disk reproducing apparatus using the PRML method, constrained length (k) and a PR coefficient of a PRML circuit can be adaptively changed when amplitude of a high-frequency component is changed depending on a situation due to track recording density, reproduction double-speed, an electronic-circuit-element characteristic, a transmission line characteristic, an optical-system characteristic and the like of a recording medium.

The optical disk reproducing apparatus according to the second embodiment (FIG. 5) is different from the apparatus according to the first embodiment (FIG. 1) mainly in a frequency-characteristic measuring circuit 501. Also, a content of determination at the determination circuit 117 according to the second embodiment is different from that according to the first embodiment. In the second embodiment, a determination about amplitude of a high-frequency component is made.

The frequency-characteristic measuring circuit 501 measures run length, which is a successive number of "0" or "1" in bit sequence of binarization data (s13) selected by the switch 116, outputted by the maximum-likelihood decoding circuit (one of 114 and 115), and amplitude of an outputted signal (s3) of the A/D converter 105 for each run length is measured.

In the apparatus, switching control of the switch 116 is performed so that the first PRML circuit 106 of k=4 causing a fewer decoding error is used, usually. And, the frequency-characteristic measuring circuit 501 detects an amplitude value corresponding to each run length from an output (s3) of the A/D converter 105 delay-adjusted and the amplitude values are averaged for a fixing period of time. The signal (s24) obtained by averaging is inputted to the determination circuit 117. Note that, delay-adjustment mentioned above means adjustment of a delay performed since a signal is delayed as flowing to a subsequent stage of a circuit, generally.

The determination circuit 117 calculates a rate between an amplitude value of long run length which is a low-frequency component and an amplitude value of run length corresponding to 2T, 3T (T is a period) which is a high-frequency component from the result (s24) described above. Then, the determination circuit 117 performs switching control of the switch 116 by a signal (s23) so that the second PRML circuit 107 of k=5 is used during a period of time in which the amplitude rate is smaller than an amplitude rate (a threshold value) of a high-frequency component set previously.

According to the method of switching the constrained length (k) of PRML based on the amplitude of the high-frequency component of the reproduction signal described above, for a signal with small amplitude of a high-frequency component difficult to be equalized with PRML of k=4 (106), PRML of k=5 (107) is selected. And, PRML of k=4 causing a fewer decoding error is selected usually. And therefore, the reading accuracy can be increased. And, in the second embodiment, since a determination position is at a position former in a circuit compared with the method of determination with equalization error according to the first embodiment, the determination can be made earlier.

Note that, in the second embodiment, a frequency characteristic is obtained by calculating an amplitude value for run length in the frequency-characteristic measuring circuit 501 in a simple manner. However, a method of calculating the frequency characteristic is not restricted to this. For example, the determination may be made through calculation using another method, such as Fourier transformation of the reproduction signal.

Third Embodiment

Figure 6:
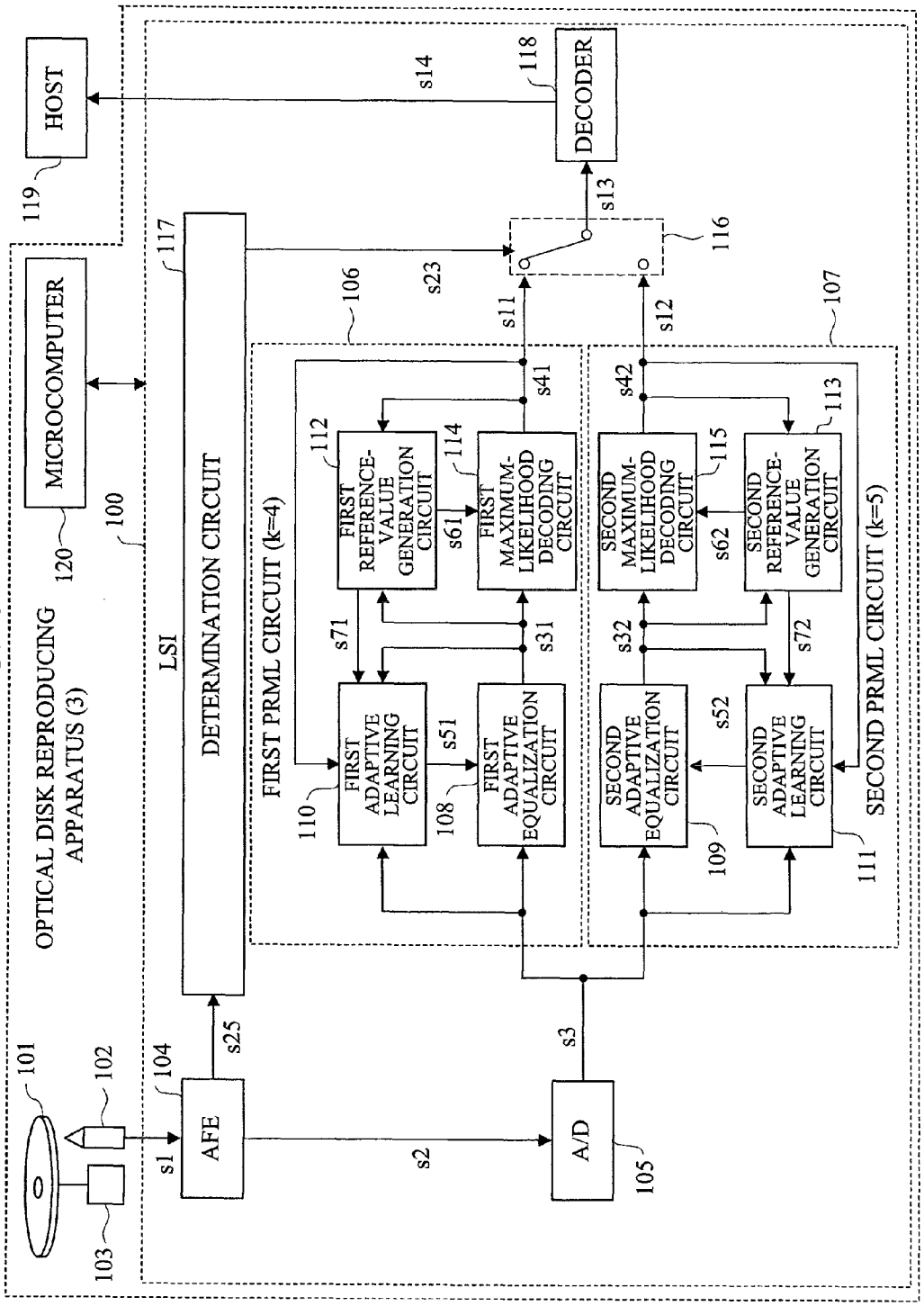
FIG. 6 is a block diagram showing a configuration of an optical disk reproducing apparatus according to a third embodiment of the present invention.

A third embodiment of the present invention is described using FIG. 6 and the like. FIG. 6 shows a configuration of an optical disk reproducing apparatus according to the third embodiment. In the third embodiment, in an optical disk reproducing apparatus using the PRML method, constrained length (k) and a PR coefficient of PRML can be adjustably changed when inter-symbol interference is changed depending on an optical-system characteristic. The third embodiment has a feature that a focus determination is performed.

Here, a case in which the inter-symbol interference is changed due to the optical-system characteristic is described. As a factor of increase in an amount of inter-symbol interference due to the optical system, focus shift exists, for example. When surface fluctuation of a reproduction medium (101) and the like occur and an optical pickup (102) cannot follow the fluctuation, focus shift which means that the reproduction medium (101) is shifted from a position where a light-gathering beam diameter on the recording layer becomes a minimum occurs. At this time, since the beam diameter is increased, even a signal of a farther mark is received, and therefore, inter-symbol interference is increased. And, because of an individual difference of the optical pickup (102), the beam diameter is not necessarily a minimum.

The optical disk reproducing apparatus according to the third embodiment (FIG. 6) is different from the apparatus according to the first embodiment (FIG. 1) mainly in that the output of the AFE 104 is also inputted to the determination circuit 117. In the determination circuit 117, determination is made using the signal (s25).

In the present embodiment, switching control of the switch 116 is performed so that the first PRML circuit 106 of k=4 causing a fewer decoding error is used, usually. And, from the AFE 104, a focus-error signal (s25) representing a state of focus shift is inputted to the determination circuit 117. The determination circuit 117 compares the focus-error signal (s25) at reproduction and a threshold value of an amount of focus error previously set in the determination circuit 117. The determination circuit 117 performs switching control of the switch 116 by the signal (s23) so that the second PRML processing circuit 107 of k=5 is used when the focus-error signal (s25) exceeds the threshold value and the state continues for a period of time longer than or equal to a predetermined period or occurs frequently.

According to the method of switching the constrained length (k) of PRML based on the amount of focus error described above, when focus shift predicted to cause increase of inter-symbol interference occurs, the PRML (106) of k=5 is selected, and usually the PRML (107) of k=4 hardly causing a decoding error is selected, and therefore, the reading accuracy is improved. And, in the third embodiment, since a determination position is at a position former in a circuit compared with the method of determination with amplitude of a high frequency component according to the second embodiment, the determination can be made earlier.

Fourth Embodiment

Figure 7:
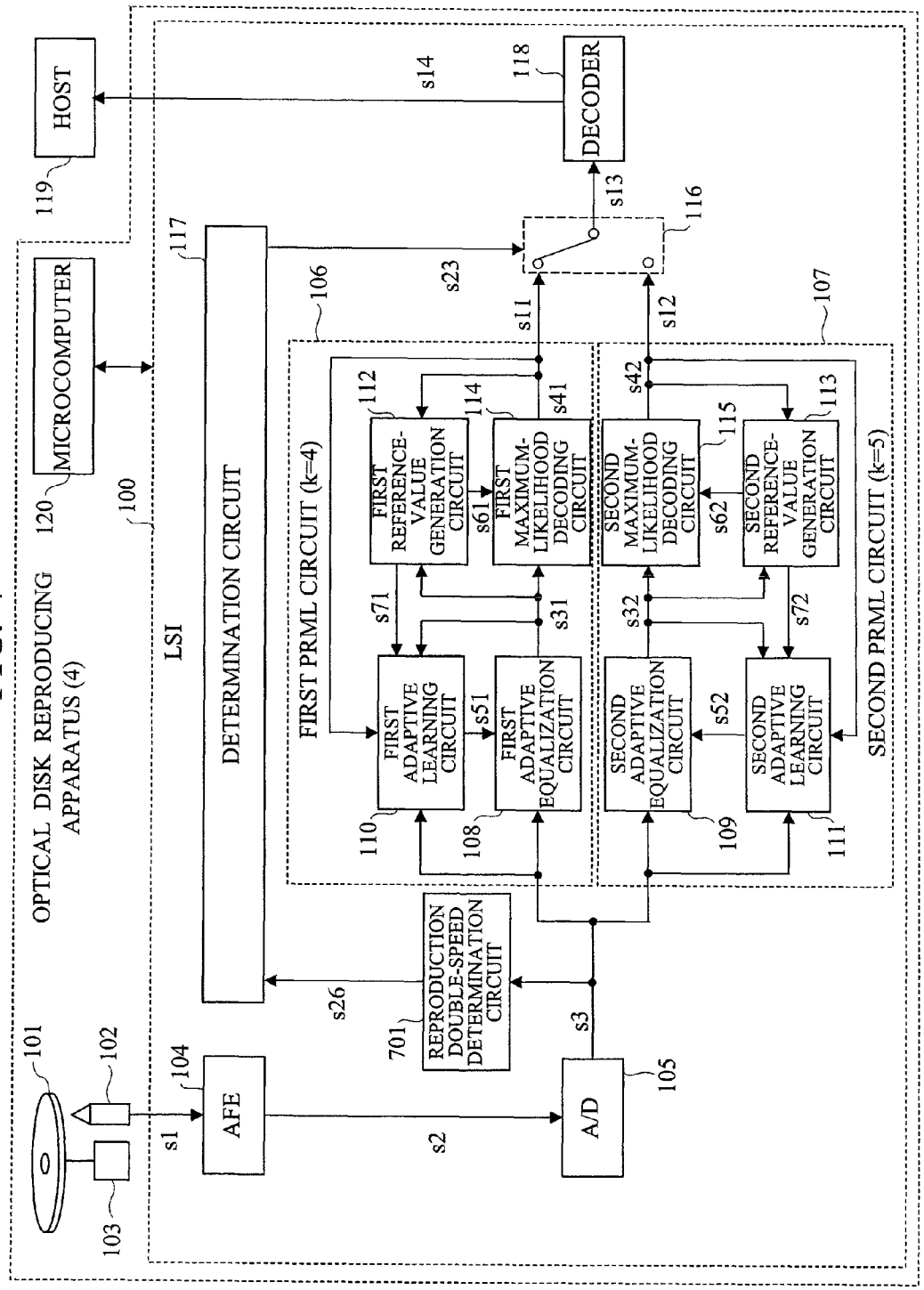
FIG. 7 is a block diagram showing a configuration of an optical disk reproducing apparatus according to a fourth embodiment of the present invention.

A fourth embodiment of the present invention is described using FIG. 7 and the like. FIG. 7 shows a configuration of an optical disk reproducing apparatus according to the fourth embodiment. In the fourth embodiment, in an optical disk reproducing apparatus using the PRML method, constrained length (k) and a PR coefficient of PRML can be adjustably changed when amplitude of a high-frequency component is changed depending on reproduction double-speed (reproduction speed) due to influence of an electronic-circuit-element characteristic, a transmission line characteristic and the like. The fourth embodiment has a feature that determination of reproduction double-speed is performed.

Here, a case in which the amplitude of a high-frequency component is changed depending on reproduction double-speed is described. If the electronic-circuit element and the transmission line do not support a high-frequency signal, with the reproduction double-speed increased further, the high-frequency component cannot be transmitted, and therefore, the amplitude of the high-frequency component of the reproduction signal is decreased, as in a case of high track recording density.

The optical disk reproducing apparatus according to the fourth embodiment (FIG. 7) is different from the apparatus according to the first embodiment (FIG. 1) mainly in that a reproduction double-speed determination circuit 701. The reproduction double-speed determination circuit 701 obtains a type of a recording medium (101) and reproduction double-speed information thereof from, for example, the microcomputer 120. The determination circuit 117 makes determination based on the reproduction double-speed information.

In the apparatus, a switching control of the switch 116 is performed so that the first PRML circuit 106 of k=4 causing a fewer decoding error is used, usually. And, as described above, since the amplitude of a high-frequency component of the reproduction signal is decreased at high-speed reproduction, in such a case, a switching control is performed so that the second PRML circuit 107 of k=5 is used.

Decrease in amplitude of the high-frequency component can be predicted from the type of the reproduction medium (101) and reproduction double-speed thereof. In the following, prediction, determination, setting and the like are systematically performed in advance. First, from the type of the reproduction medium (101) and reproduction double-speed, a frequency band of the reproduction signal is calculated, and then is compared with a frequency characteristic of the entire optical disk reproducing apparatus obtained in advance from the electronic-circuit-element characteristic, the transmission line characteristic and the like. From a result of the comparison, a combination of the type of reproduction medium and reproduction double-speed having a characteristic of the reproduction signal similar to that of the PR characteristic of k=5 can be found. Since a frequency characteristic of the entire optical disk reproducing apparatus is unique and is difficult to be changed by a situation, a combination of the type of reproduction medium and reproduction double-speed predicted to be similar to the PR characteristic of k=5 is found. This combination information is recorded in the determination circuit 117 in advance.

At the data reproduction, the reproduction double-speed determination circuit 701 obtains the type of the reproduction medium and the reproduction double-speed information through, for example, the microcomputer 120, and a signal (s26) thereof is inputted to the determination circuit 117. Then, the determination circuit 117 performs switching control of the switch 116 by the signal (s23) so that the second PRML circuit 107 of k=5 is used when the inputted information (s26) agrees with the combination information of the type of the reproduction medium and reproduction double-speed recorded in the determination circuit 117 in advance.

According to the method of switching the constrained length (k) of PRML by the type of the reproduction medium and reproduction double-speed described above, the PRML circuit of k=5 (107) is selected at high-speed reproduction on a high-density medium (101) in which increase in inter-symbol interference is predicted, whilst the PRML circuit of k=4 (106) hardly causing a decoding error is selected at usual operation, and therefore, the reading accuracy is improved. And, in the fourth embodiment, since a determination position is at a position former in a circuit compared with the method of determination with the amount of focus error according to the third embodiment, the determination can be made earlier. Note that, in the fourth embodiment, an example in which the microcomputer 120 is used as a means of obtaining and determining information of the type of the reproduction medium and the reproduction double-speed is described, but it is not limited thereto. Alternatively, for example, the reproduction double-speed determination circuit 701 can obtain the information from a component, such as the AFE 104, and make determination.

Fifth Embodiment

Figure 8:
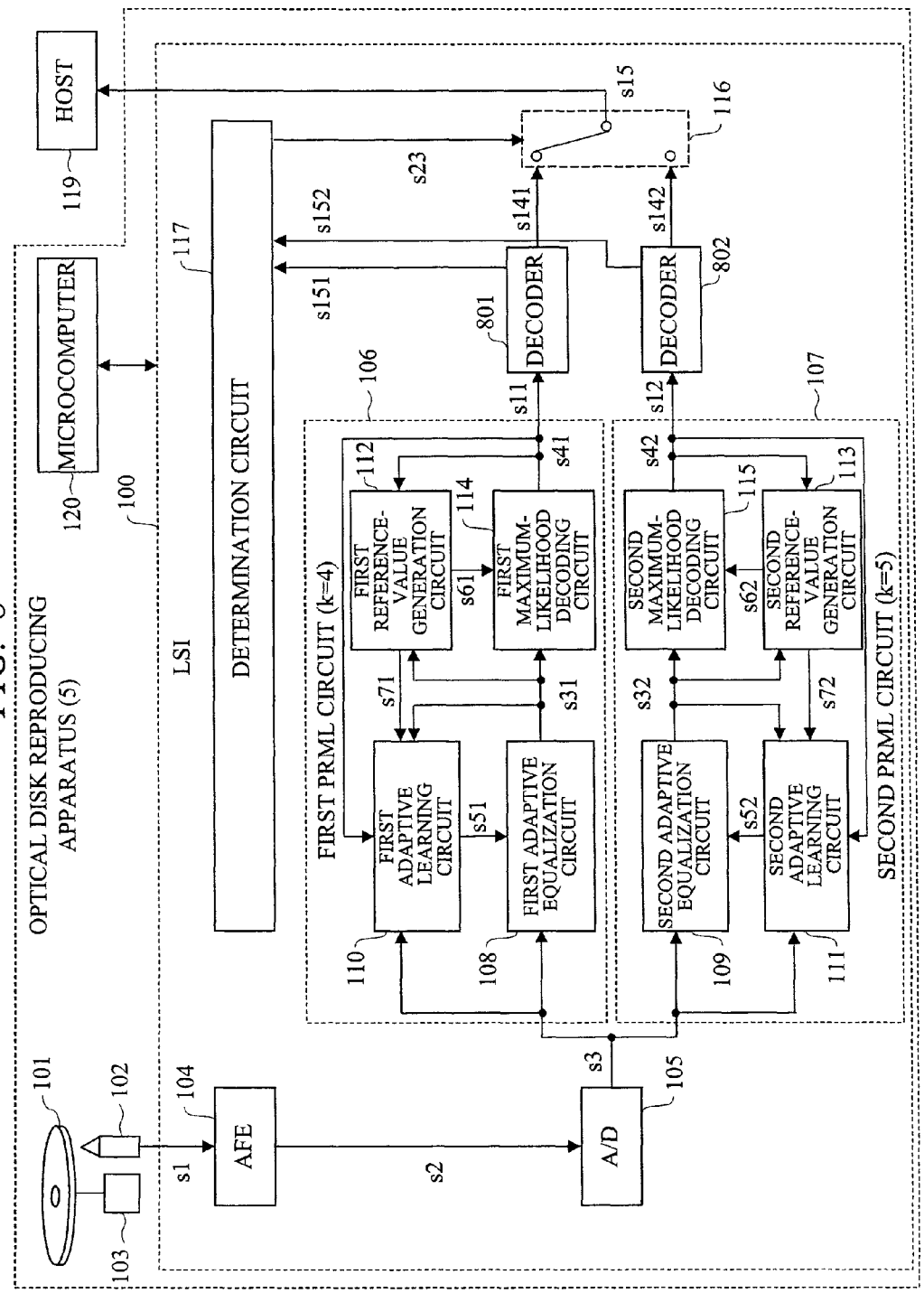
FIG. 8 is a block diagram showing a configuration of an optical disk reproducing apparatus according to a fifth embodiment of the present invention.

Fifth embodiment of the present invention is described using FIG. 8 and the like. An apparatus according to the fifth embodiment has a feature that two decoders capable of simultaneous processing are provided and determination of an error rate (the number of error detections) is performed. FIG. 8 shows a configuration of an optical disk reproducing apparatus according to the fifth embodiment. In the fifth embodiment, in an optical disk reproducing apparatus using the PRML method, constrained length (k) and a PR coefficient of PRML can be adaptively changed when the number of error detections at error correction is changed depending on a situation due to track recording density, reproduction double-speed, an electronic-circuit-element characteristic, a transmission line characteristic, an optical-system characteristic and the like of a recording medium.

Here, a case in which the number of error detections is varied with the constrained length (k) is described. First, at error correction of binarization data obtained by decoding at each PRML of the constrained length (k), each number of error detections is obtained and compared. Here, as an example of a case in which the number of error detections in a decoding result of the PRML of k=4 is large, a case in which the PRML circuit of k=4 cannot be used for equalization, such as a case in which amplitude of a high-frequency component of an inputted signal is small exists. Also, as an example of a case in which the number of error detections in a decoding result of the PRML circuit of k=5 is large, a case in which the PRML circuit of k=4 can be used for equalization also, such as a case in which amplitude of a high-frequency component of the inputted signal is large exists. This is because the PRML circuit of k=5 has a greater tendency to cause a decoding error than that of k=4 since the number of reference levels is large in the PRML circuit of k=5.

The optical disk reproducing apparatus (FIG. 8) according to the fifth embodiment is different from the apparatus (FIG. 1) according to the first embodiment mainly in two decoders 801 and 802. The decoder (a first decoder) 801 performs a series of decoding processings, that is, a demodulation processing, an error correction processing and a descrambling processing to binarization data (s11) which is an output (s41) of the first maximum-likelihood decoding circuit 114. The decoder (a second decoder) 802 performs a series of decoding processings, that is, a demodulation processing, an error correction processing and a descrambling processing to binarization data (s12) which an output (s42) of the second maximum-likelihood decoding circuit 115. The switch 116 switches between outputs (s141, s142) of the two decoders 801 and 802 and outputs data (s15) to outside (the host 119). And, from the decoders 801 and 802, the numbers of error detections (s151, s152) in the error detection processing are inputted to the determination circuit 117.

In the apparatus, the first decoder 801 performs error correction to the decoding result (s11) of the first maximum-likelihood decoding circuit 114, and the number of error detections (s151) in ECC block unit data is obtained (ECC: error correction code). Also, the second decoder 802 performs error correction to the decoding result (s12) of the second maximum-likelihood decoding circuit 115, and the number of error detections (s152) in ECC block unit data is obtained. A detailed configuration of each decoder is similar to that in the known art.

The determination circuit 117 compares the numbers of error detections (s151, 152) inputted and performs switching control of the switch 116 so that one of the decoded outputs (s141, s142) of the PRML circuits (106, 107) having a smaller number of error detections is selected.

According to the method of switching the constrained length (k) of PRML by the number of error detections described above, the PRML circuit of the constrained length (k) having a smaller number of error detections is always selected, and therefore, the reading accuracy can be improved. And, since the determination is made by the number of error detections included in final output data, the method according to the fifth embodiment is reliable.

Note that, in the fifth embodiment, the number of error detections in each ECC block unit at error correction is used, but it is not limited thereto. Alternatively, for example, the number of error detections at error correction in a row direction in an ECC block may be used.

Sixth Embodiment

Figure 9:
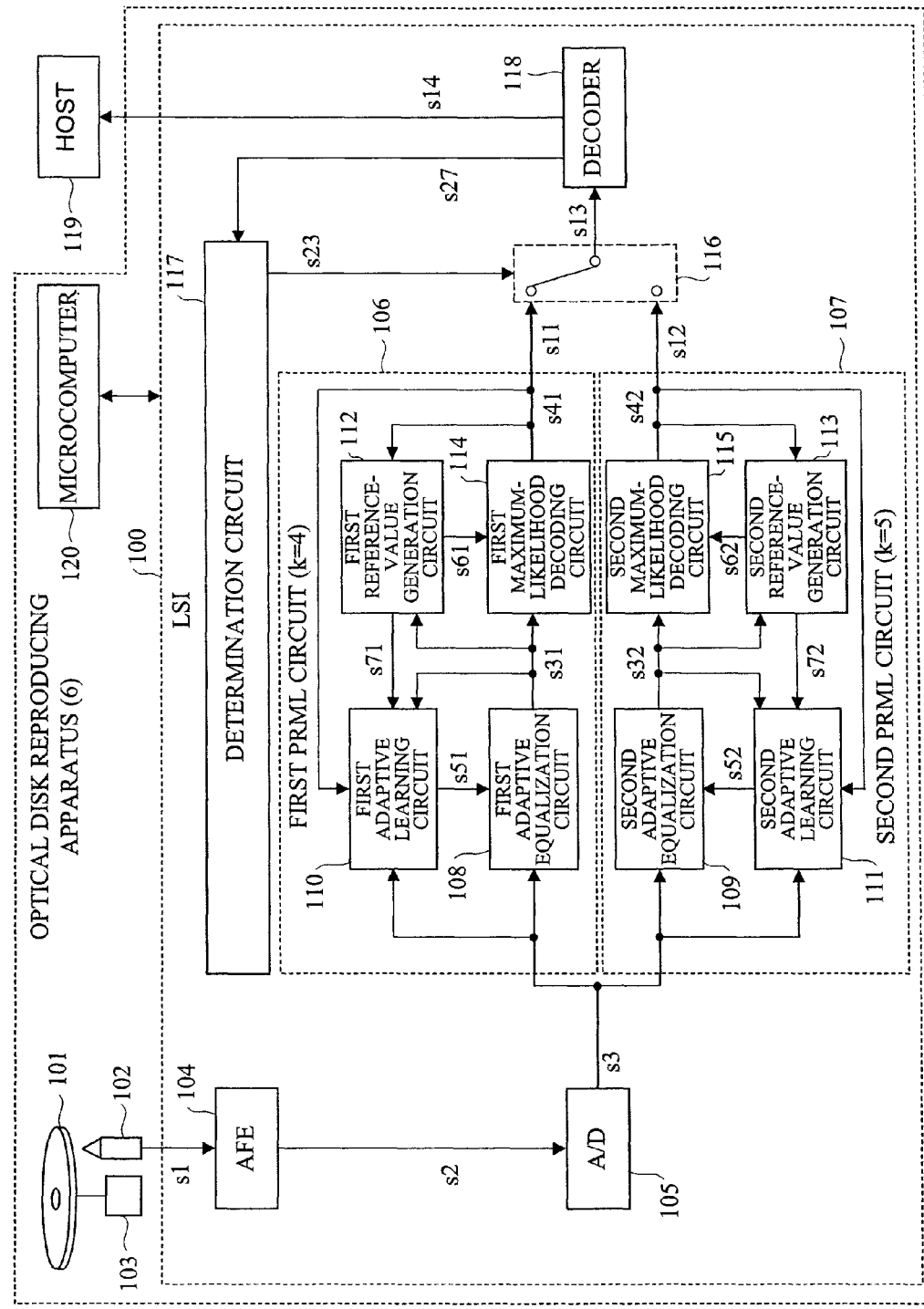
FIG. 9 is a block diagram showing a configuration of an optical disk reproducing apparatus according to a sixth embodiment of the present invention.

A sixth embodiment of the present invention is described using FIG. 9 and the like. The sixth embodiment has a feature that one decoder for processing commonly is provided and an error rate is determined. FIG. 9 shows a configuration of an optical disk reproducing apparatus according to the sixth embodiment. In the sixth embodiment, in the same way as the fifth embodiment, constrained length (k) and a PR coefficient of PRML can be adaptively changed when the number of error detections at error correction is changed depending on a situation.

The optical disk reproducing apparatus (FIG. 9) according to the sixth embodiment is different from the apparatus according to the first embodiment (FIG. 1) mainly in that the number of error detections (s27) is inputted from the decoder 118 to the determination circuit 117.

Switching control in the optical disk reproducing apparatus according to the sixth embodiment is described. As one example of the control (a first configuration example), the following processing is performed in an initialization processing before usual data reproduction. In the apparatus, for a fixing period of time, switching control of the switch 116 is performed so that a first PRML circuit 106 of k=4 is used. With a signal (s27) from a decoder 118, the number of error detections (a first number of error detections) in the fixing period of time (a first period) is recorded in the determination circuit 117, firstly. And, in the apparatus, for another fixing period of time (a second period), switching control of the switch 116 is performed so that the second PRML circuit 107 of k=5 is used. The number of error detections (a second number of error detections) therein is inputted to the determination circuit 117 in a manner similar to the above. The determination circuit 117 compares the second number of error detections with the first number of error detections recorded in advance and performs a switching control of the switch 116 by a signal (s23) so that one of the outputs (s11, s12) of the PRML circuits (106, 107) having a smaller number of error detections is selected. Here, since this number of error detections is varied with the inputted signal, the above-described switching and determination has to be performed regularly. And, the determination may be performed regularly during normal reproduction.

Still further, other than the control performed in the initialization processing (a first configuration example), similar control can be performed at a retry, that is, at a reprocessing of data because of an error incapable of being error-corrected or the like at usual data reproduction (a second configuration example). In this case, the apparatus first performs control so that the first PRML circuit 106 of k=4 having a smaller number of decoding errors is used. When an error incapable of being error-corrected is detected during data reproduction and a retry is required, control is performed so that the second PRML circuit 107 of k=5 is used and the retry is performed. When the data can be reproduced by this retry, the second PRML circuit 107 of k=5 is used until the next retry. If an error incapable of being error-corrected still occurs, the first PRML circuit 106 of k=4 is selected again, and a retry is performed with parameters changed. Similarly, also in a subsequent retry, switching to a PRML circuit of the other constrained length (k) is performed and the retry is performed.

According to the method of switching the constrained length (k) of PRML based on the number of error detections described above, the PRML circuit of the constrained length (k) having a smaller number of error detections is always selected like the fifth embodiment, and therefore, the reading accuracy can be increased. And, in the sixth embodiment, unlike the firth embodiment, since another decoder is not required, circuit size and power consumption can be reduced.

Seventh Embodiment

Figure 10:
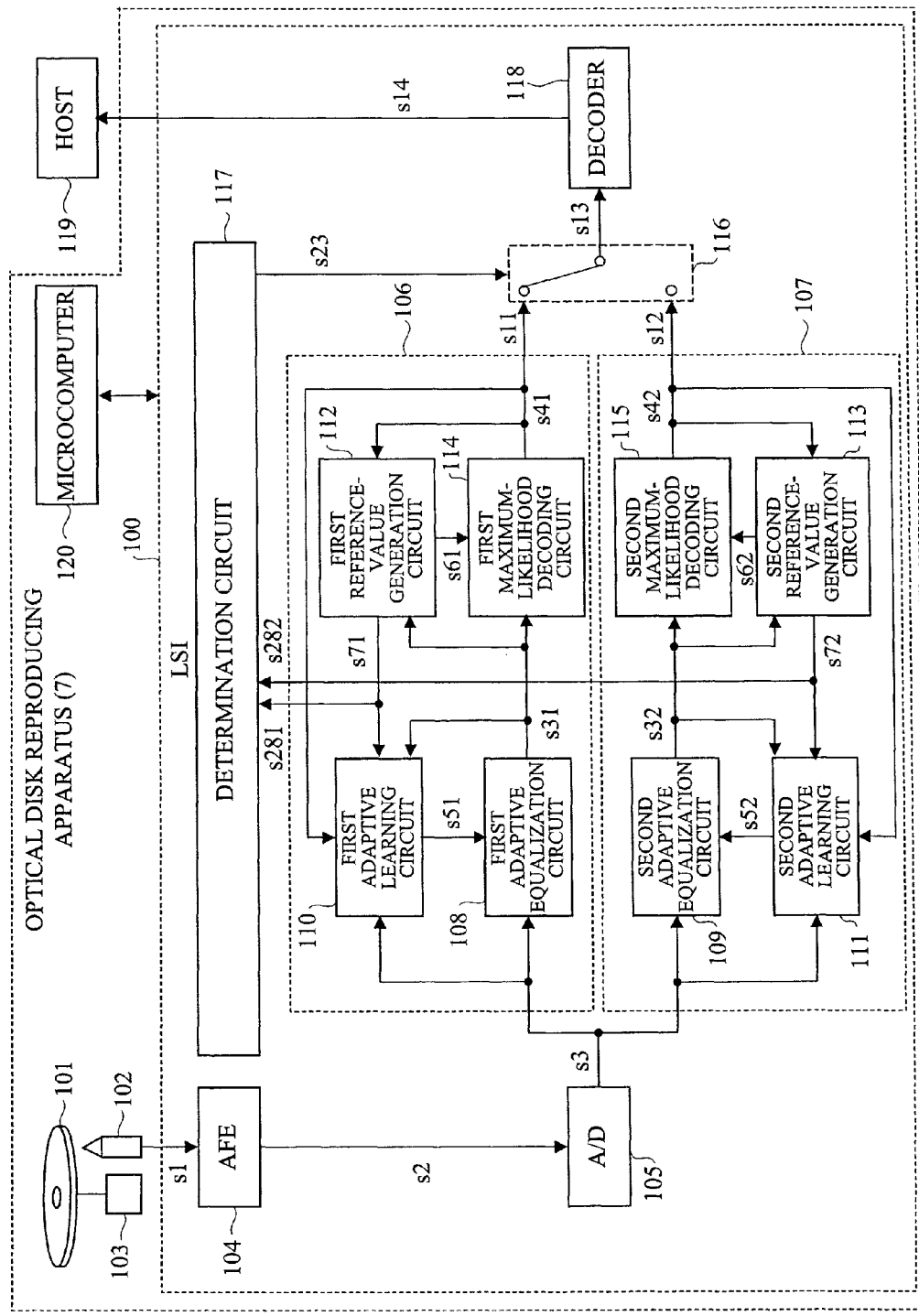
FIG. 10 is a block diagram showing a configuration of an optical disk reproducing apparatus according to a seventh embodiment of the present invention.

A seventh embodiment of the present invention is described using FIG. 10 and the like. An apparatus according to the seventh embodiment has a feature that reference-level-interval determination is performed. FIG. 10 shows a configuration of an optical disk reproducing apparatus according to the seventh embodiment. In the seventh embodiment, in an optical disk reproducing apparatus using the PRML method, in a case where an interval between reference levels (reference values) for use in maximum-likelihood decoding is changed depending on a situation due to track recording density, reproduction double-speed, an electronic-circuit-element characteristic, a transmission line characteristic, an optical-system characteristic and the like of a recording medium, constrained length (k) and a PR coefficient of PRML can be changed adaptively.

The optical disk reproducing apparatus (FIG. 10) according to the seventh embodiment is different from the apparatus according to the first embodiment (FIG. 1) mainly in that the output (s72) of the second reference-value generation circuit 113 is inputted to the determination circuit 117 as a second reference-level signal (s282). Correspondingly, the output (s71) of the first reference-value generation circuit 112 is inputted to the determination circuit 117 as a first reference-level signal (s281).

Here, in general, a PRML circuit of k=5 is superior to a PRML circuit of k=4 in that, for example, decoding can be performed even in a case where amplitude of a high-frequency component of a reproduction signal is small. However, since the number of reference levels is large, a decoding error tends to occur. Since the number of reference levels is large as described above, if the reference levels are close to each other, possibility of an error seems to be increased.

And therefore, in the apparatus, control is performed so that the second PRML circuit 107 of k=5 capable of equalizing even a signal having small amplitude of a high-frequency component is used, usually. Note that, an interval between reference levels (s71, s72) generated at the first reference-value generation circuit 112 and the second reference-value generation circuit 113 (a reference level interval) is observed at the determination circuit 117. In particular, every interval at respective reference levels (s72) generated at the second reference-value generation circuit 113 is observed. Note that, the reference level interval is a value such as a1 or a2 in FIG. 3. And, the determination circuit 117 performs switching control of the switch 116 by the signal (s23) so that the first PRML circuit 106 of k=4 is selected during a period of time in which a reference level interval smaller than a value (a threshold value) recorded in advance exists.

Furthermore, by using the method and configuration according to the seventh embodiment and the other embodiments described above in combination, a determination in the other embodiments can be protected. This is because, for example, even if the second PRML circuit 107 of k=5 is selected by another determination method, the constrained length (k) can be switched so as to use the first PRML circuit 106 of k=4 (determination control returning to an opposite side) in a situation where many decoding errors by the second PRML circuit 107 are predicted.

According to the method of switching the constrained length (k) of PRML by the reference level (an interval) used in maximum-likelihood decoding described above, even if the PRML circuit of k=5 (107) that tends to cause a decoding error is selected, increase in the number of error detections can be avoided, and therefore, the reading accuracy can be improved. For this reason, the seventh embodiment can be used not only independently but also in combination with other embodiments, thereby increasing reliability of a determination result of the other embodiments.

Eighth Embodiment

Figure 11:
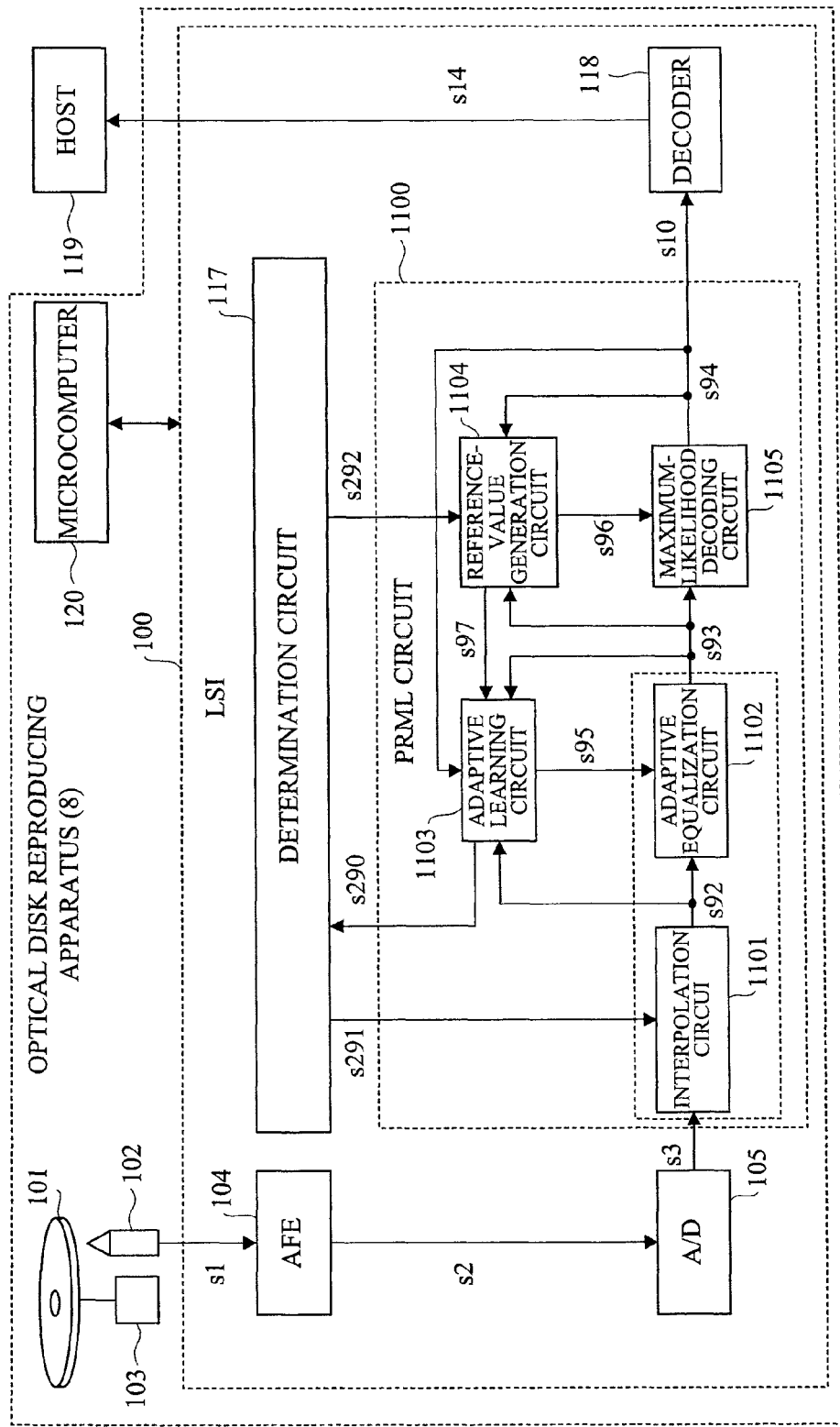
FIG. 11 is a block diagram showing a configuration of an optical disk reproducing apparatus according to an eighth embodiment of the present invention.

An eighth embodiment of the present invention is described using FIG. 11 and the like. FIG. 11 shows a configuration of an optical disk reproducing apparatus according to the eighth embodiment. The eighth embodiment is an example in which sharing of circuits included in the PRML circuits (106, 107) of two types of constrained lengths (k1, k2) is achieved for the above-described embodiments.

The optical disk reproducing apparatus (FIG. 11) according to the eighth embodiment is different from the apparatus according to the first embodiment (FIG. 1) in an interpolation circuit 1101, an adaptive equalization circuit 1102, an adaptive learning circuit 1103, a reference-value generation circuit 1104 and a maximum-likelihood decoding circuit 1105.

In the eighth embodiment, the PRML circuit of the first constrained length (k1) in the first embodiment is assumed to be a PRML circuit of k=4, and the PRML circuit of the second constrained length (k2) in the first embodiment is assumed to be a PRML circuit of k=5. And a configuration of circuit sharing of the PRML circuit of k=4 and the PRML circuit of k=5 is described.

In general, a sampling position of a signal inputted to the maximum-likelihood decoding circuit in the PRML circuit of k=4 and a sampling position of a signal inputted to the maximum-likelihood decoding circuit in the PRML circuit of k=5 are different from each other, and therefore, two types of number of taps of a filter of the adaptive equalization circuit, that is, an odd number and an even number, are required. For this reason, two circuits, such as the first adaptive equalization circuit 108 and the second adaptive equalization circuit 109 in the first embodiment are required.

Here, a need for changing a sampling position of a signal inputted to a maximum-likelihood decoding circuit is described. For example, in a modulation method, such as RLL(1, 10), PR(a, b, a, b) of k=4 generally has seven reference levels, and PR(a, b, c, b, a) of k=5 generally has ten reference levels. If a target waveform at equalization-learning is made based on these reference levels, bit boundary sampling performing sampling on timing of zero-cross of waveform is established for k=4, and bit center sampling performing sampling before or after timing of zero-cross is established for k=5. And therefore, to perform stable adaptive-learning, it is desirable to change the sampling position of an output of the adaptive equalization circuit according to the constrained length (k).

However, if the sampling position of data inputted to the adaptive equalization circuit is switched according to the constrained length (k), one adaptive equalization circuit would be enough. In the eighth embodiment, in order to realize switching of the sampling position according the constrained length, the sampling position is switched by the interpolation circuit 1101 provided before the equalization circuit (an adaptive equalization circuit). For example, a case where bit centering sampling is performed to an output (s3) of the A/D converter 105 is considered. For k=5, the interpolation circuit 1101 is not used, and equalization is performed in the adaptive equalization circuit 1102 of an odd number of taps. For k=4, the interpolation circuit 1101 is used to convert the signal of bit center sampling to that of bit boundary, and then, equalization is performed in the adaptive equalization circuit 1102 of an odd number of taps. As described above, a case of k=4 and a case of k=5 can be supported by the same adaptive equalization circuit 1102 having an odd number of taps. Here, the interpolation circuit 1101 can be disposed after the equalization circuit by changing a learning method.

And, in a case where tap disposition of the adaptive equalization circuit in the PRML circuit of k=4 and tap disposition of the adaptive equalization circuit in the PRML circuit of k=5 are different from each other, in order to support the respective tap disposition, two circuits, such as the first adaptive learning circuit 110 and the second adaptive learning circuit 111 in the first embodiment, are required. However, in a case where tap disposition of the adaptive equalization circuit is the same irrespectively of the constrained length (k), one adaptive learning circuit would be enough. In the eighth embodiment, by using the interpolation circuit 1101, the adaptive equalization circuit 1102 is shared among circuits of different constrained length (k). And therefore, a case of k=4 and a case of k=5 can be supported by one adaptive learning circuit 1103.

And, since the number of existing states is different between the PRML circuit of k=4 and the PRML circuit of k=5, the number of reference levels is different, and therefore, two circuits, such as the first reference-value generation circuit 112 and the second reference-value generation circuit 113, are required to support each of the number of reference levels. However, since operation contents themselves of the reference-value generation circuits are the same irrespectively of the number of reference levels, if the reference-value generation circuit supporting a larger number of reference levels is partially used and shared in a processing of the constrained length (k) of a smaller number of reference levels, one reference-value generation circuit would be enough. And therefore, as in the eighth embodiment, a case of k=4 and a case of k=5 can be supported by one reference-value generation circuit 1104.

And, since an amount of reference data is different between the PRML circuit of k=4 and the PRML circuit of k=5 and since maximum-likelihood operation at decoding is also different, two circuits, such as the first maximum-likelihood decoding circuit 114 and the second maximum-likelihood decoding circuit 115 in the first embodiment, are required. However, if an amount of reference data at the maximum-likelihood decoding is set to be the same irrespectively of the constrained length (k), one maximum decoding circuit would be enough. For example, in the maximum-likelihood decoding circuit 1105 according to the eighth embodiment, in order to share a decoding circuit supporting PR(a, b, c, d, e) of k=5 with a decoding circuit of k=4, a maximum-likelihood decoding operation is performed with PR(0, a, b, c, d) or PR(a, b, c, d, 0). With this, the amounts of reference data become the same. And therefore, a plurality of constrained length (k) can be supported by one maximum-likelihood decoding circuit 1105.

In the eighth embodiment, PRML circuits of k=4 and k=5 are described as examples. In a case of PRML circuits of k=5 and k=3, by setting as PR(0, a, b, c, 0), the sharing is achieved. And the method can be applied to other constrained length (k).

Here, switching control in the optical disk reproducing apparatus according to the eighth embodiment is described. Even if the circuit sharing is achieved, switching such as setting as PR(0, a, b, c, d) in the maximum-likelihood decoding circuit 1105 in a case of k=4 or setting not to use the interpolation circuit 1101 in a case of k=5 is required when PRML circuits of different constrained length (k) are used. And therefore, in the optical disk reproducing apparatus, the determination circuit 117 controls the interpolation circuit 1101 and the maximum-likelihood decoding circuit 1105 by signals (s291, s292) so that the PRML circuit of k=4 having fewer decoding errors is used, usually. And, an equalization error value (s290) calculated at the adaptive learning circuit 1103 is inputted to the determination circuit 117, and the determination circuit 117 controls the interpolation circuit 1101 and the maximum-likelihood decoding circuit 1105 so that the PRML circuit of k=5 is used during a period of time in which the equalization error value exceeds a value recorded in advance (a threshold value). Note that, in the eighth embodiment, as for the switching control, the method of making determination by the equalization error in the first embodiment is employed. However, it is not limited thereto and a method of another embodiment can be employed.

As described above, in the eighth embodiment, a circuit included in the PRML circuits (106, 107) of k=4 and k=5 in the first embodiment can be shared. With this, circuit size can be reduced. Note that, in description of the eighth embodiment, although the eighth embodiment is compared with the first embodiment, the method can be applied to the other embodiments.

<Combination>

Figure 12:
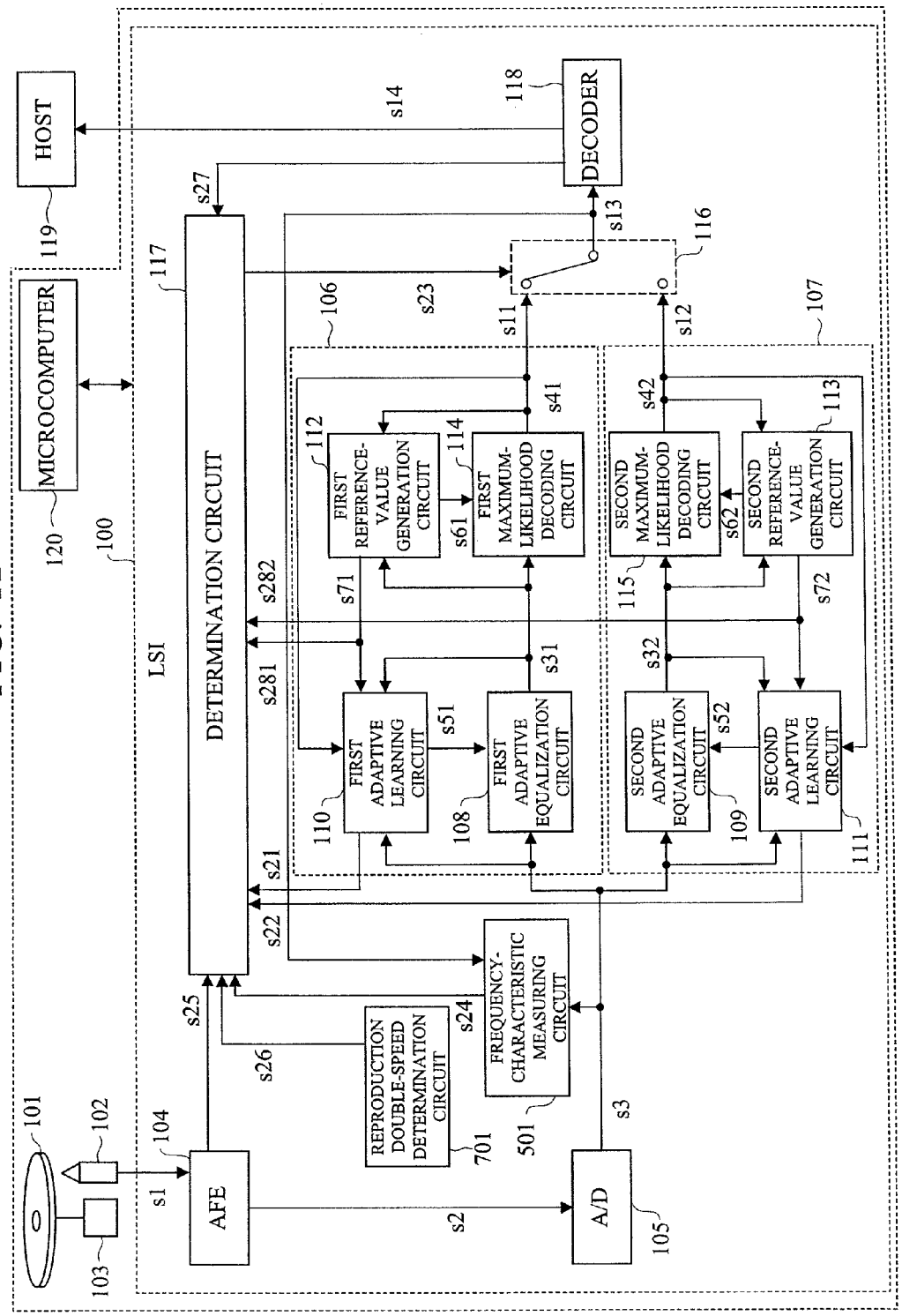
FIG. 12 is a block diagram showing a configuration of an optical disk reproducing apparatus according to another embodiment of the present invention.

FIG. 12 shows, as another embodiment, an example of a configuration of an optical disk reproducing apparatus in which configurations and methods of the respective embodiments described above are combined together. In the configuration example, the first to fourth embodiments and the sixth and the seventh embodiments are combined together. Note that, a case corresponding to the sixth embodiment is shown here, but the same goes for a case corresponding to the fifth embodiment. In the embodiment, the constrained length (k) and the PR coefficient of PRML can be adaptively changed in a case where a reference level interval used in maximum-likelihood decoding is changed depending on a situation due to track recording density, reproduction double-speed, an electronic-circuit-element characteristic, a transmission line characteristic, an optical-system characteristic and the like of a recording medium. As in the configuration example, by using a plurality of determination methods in combination, the reading accuracy can be improved according to various situations.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be utilized in a reproducing apparatus and a recording-reproducing apparatus for various recording medium, such as CD, DVD, and Blu-ray Disc.

What is claimed is:

1. An optical disk reproducing apparatus comprising:
a pickup irradiating laser light to an optical disk and converting reflected light thereof to an electric signal;
an analog front end performing an analog processing to the electric signal outputted from the pickup;
a digitalization circuit digitalizing an analog signal outputted from the analog front end and outputting a multi-level signal;
a first PRML (Partial Response Maximum Likelihood) processing circuit of a PRML method with constrained length of m; and
a second PRML processing circuit of the PRML method with the constrained length of n, where n≧m,
wherein the first PRML processing circuit includes:
a first equalization circuit equalizing the multi-level signal with a target signal of the PRML method with the constrained length of m;
a first reference-value generation circuit generating a first target signal of the PRML method with the constrained length of m from a first equalization signal outputted from the first equalization circuit and a first binarization signal consisting of a maximum-likelihood decoded output;
a first adaptive learning circuit determining a parameter of the first equalization circuit from the first equalization signal and the first target signal; and a first maximum-likelihood decoding circuit obtaining the first binarization signal from the first target signal and the first equalization signal based on the PRML method with the constrained length of m, wherein the second PRML processing circuit includes:

a second equalization circuit equalizing the multi-level signal with a target signal of the PRML method with the constrained length of n;

a second reference-value generation circuit generating a second target signal of the PRML method with the constrained length of n from a second equalization signal outputted from the second equalization circuit and a second binarization signal comprised of a maximum-likelihood decoded output;

a second adaptive learning circuit determining a parameter of the second equalization circuit from the second equalization signal and the second target signal; and a second maximum-likelihood decoding circuit obtaining the second binarization signal from the second target signal and the second equalization signal based on the PRML method with the constrained length of n, and wherein the optical disk reproducing apparatus includes:

a switch selecting and outputting one of an output of the first maximum-likelihood decoding circuit and an output of the second maximum-likelihood decoding circuit;

a decoder performing a decode-processing to an output of the switch and outputting a reproduction data signal;

a measurement circuit measuring an amplitude value of a high-frequency component of the multi-level signal from the multi-level signal and the output of the switch; and a determination circuit performing switching control of the switch between the output of the first maximum-likelihood decoding circuit and the output of the second maximum-likelihood decoding circuit based on an output of the measurement circuit.

2. The optical disk reproducing apparatus according to claim 1, wherein the determination circuit performs control so that the output of the second maximum-likelihood decoding circuit is selected only during a period of time making the amplitude value of the high-frequency component consisting of the output of the measurement circuit smaller than a predetermined value.

3. The optical disk reproducing apparatus according to claim 1, wherein the constrained length m is 4 and the constrained length n is 5.

* * * * *